No. 851,577. PATENTED APR. 23, 1907.
D. WEAVER.
CROSS ARM PIN.
APPLICATION FILED JULY 7, 1906.
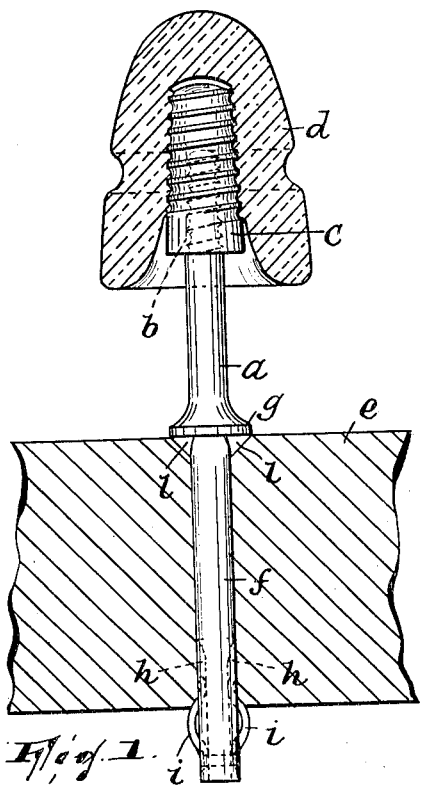
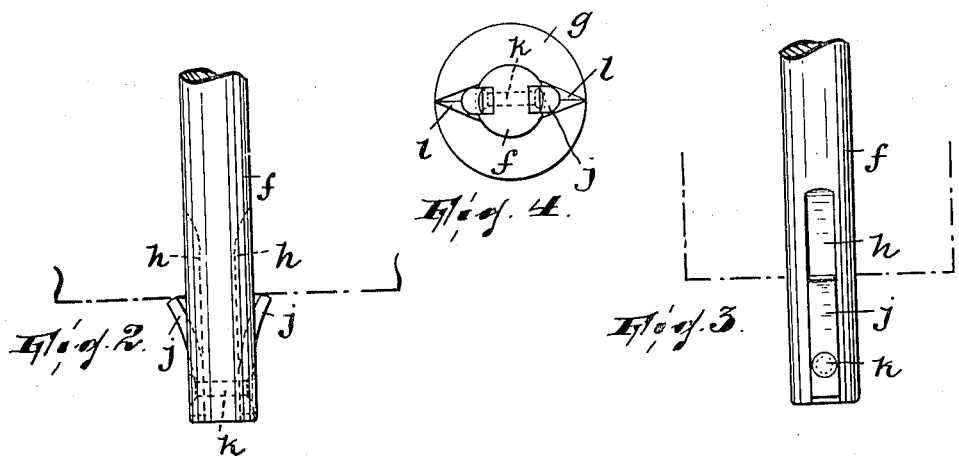
WITNESSES:
Wm. D. Bell.
A. Glatt.
INVENTOR
David Weaver,
BY
Arthur Seward,
ATTORNEYS.

UNITED STATES PATENT OFFICE.

DAVID WEAVER, OF PATERSON, NEW JERSEY.

CROSS-ARM PIN.

No. 851,577.     Specification of Letters Patent.     Patented April 23, 1907.

Application filed July 7, 1906. Serial No. 325,070.

*To all whom it may concern:*

Be it known that I, DAVID WEAVER, a citizen of the United States, residing in Paterson, county of Passaic, State of New Jersey, have invented certain new and useful Improvements in Cross-Arm Pins; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to "cross arm pins" *i. e.*, the devices employed for supporting insulators for electric conductors. As commonly constructed, such pins have their upper ends threaded to receive a wooden threaded head on to which the insulator is directly screwed, and they have a shank at the upper end of which is a shoulder adapted to take against the top of the cross arm penetrated by the shank and the lower end of which is threaded to receive a nut and washer. The process of attaching such pins in position in the cross arms is a slow one, owing to the necessity of manipulating the nuts and washers after the holes have been bored in the cross arms and the pins inserted.

My present invention has for its object to so construct the pins that it will only be necessary to drive them in place in order to secure them against unintentional upward displacement; a further object is to so construct the pins that they may, if desired or necessary, be removed from the cross arms much more quickly and quite as conveniently as the pins at present in use.

Referring to the accompanying drawings, wherein my invention is fully illustrated, Figure 1 shows a cross arm in section and one form of my improved pin arranged therein; Fig. 2 is a side view, slightly enlarged, of another form of my improved pin; Fig. 3 is a view like Fig. 2, except the pin is shown as turned through a quarter revolution; and, Fig. 4 is an underneath view of the improved pin.

In the drawings, $a$ is the pin having its upper end threaded, as at $b$, and carrying the threaded wooden head $c$ on to which is screwed the glass insulator $d$.

$e$ represents the cross arm.

$f$ designates the shank of the pin. At the upper end of the shank, the pin is formed with the shoulder $g$, adapted to abut against the top of the cross tie $e$. The shank is somewhat longer than the cross tie is thick, so that its lower end protrudes from the cross tie. Said lower end of the shank is preferably grooved, as at $h$, say at two diametrically opposite points; such grooves extend longitudinally of the pin, and in them are arranged clips of, say, the forms $i$ or $j$ shown in the drawings. These clips are preferably secured in place by means of a rivet $k$ passed through the lower end of the shank. The clips $i$ extend upwardly from the rivet and are curved first outwardly and then inwardly again, their free ends lying in the grooves and being spaced from the shoulder $g$ slightly less than the thickness of the dross arm so that when the pin is driven into the cross arm the latter will be held firmly against vertical displacement. The clips $j$ extend upwardly from the rivet $k$ and flare outwardly, being adapted to abut squarely against the under side of the cross arm when the pin has been driven home. In either instance, the clips will hold the pin securely in place, so that the pin can not be removed from the cross arm except the clips be forced together by a suitable implement.

I preferably provide knives or webs $l$ formed between the shoulder $g$ and the shank $f$. The object of this is to prevent the pin turning in the cross arm and so possibly damaging the clips under the strain which comes when the insulator is screwed on to the head $c$.

Having thus fully described my invention, what I claim as new and desire to secure by Letters Patent is:

A cross arm pin having a shoulder and, below said shoulder and spaced therefrom, curved diametrically opposite longitudinal grooves, yielding clips each having both ends in said grooves and the intermediate portion projecting therefrom coacting with the shoulder to limit the vertical movement of the pin in its cross arm, and a rivet extending through said pin and the clips, substantially as described.

In testimony, that I claim the foregoing, I have hereunto set my hand this 30th day of June, 1906.

DAVID WEAVER.

Witnesses:
JOHN W. STEWARD,
JAMES HOWLEY